United States Patent

[11] 3,561,609

[72] Inventors Donald W. Doherty
 Park Ridge;
 William P. Crockett, Jr.; William P. Crockett, III, administrator, Park Ridge, Ill.
[21] Appl. No. 749,259
[22] Filed July 29, 1968
[45] Patented Feb. 9, 1971
[73] Assignee Queen Manufacturing Company, Inc.
 Chicago, Ill.
 a corporation of Illinois

[54] GARMENT RACK AND SQUARE TUBE ASSEMBLY THEREFOR
 7 Claims, 13 Drawing Figs.
[52] U.S. Cl. .................................................. 211/177,
 211/182, 248/300, 287/54
[51] Int. Cl. .................................................. A47f 5/10,
 E04g 7/02, F16b 7/22
[50] Field of Search .................................................. 211/177,
 148, 148A, 182; 248/188, 243, 165; 312/257,
 257SK, SM; 287/189.36H, 54A-C; 99/449;
 108/107, 111, 110; 248/300

[56] References Cited
 UNITED STATES PATENTS

| | | | |
|---|---|---|---|
| 850,658 | 4/1907 | Koonce | 211/176X |
| 898,751 | 9/1908 | Krantz | 287/189.36HX |
| 2,101,349 | 12/1937 | Sharp | 287/189.36H |
| 2,947,554 | 8/1960 | Koch | 287/54A |
| 3,304,108 | 2/1967 | Hamilton et al. | 287/189.36H |
| 3,123,221 | 3/1964 | Haag | 211/177 |
| 3,317,227 | 5/1967 | Nijhuis | 287/189.36H |
| 3,351,367 | 11/1967 | Beckman | 287/189.36H |
| 3,353,507 | 11/1967 | Squires | 211/148X |

FOREIGN PATENTS

| 379,739 | 8/1964 | Switzerland | 287/189.36H |
|---|---|---|---|

*Primary Examiner*—Ramon S. Britts
*Attorney*—Parker, Carter & Markey

ABSTRACT: A garment rack and means of assembling such structures involving angularly disposed square tubing, including adapters enclosed and concealed within the tubing and locked thereinto, the adapters being effective to lock tubing elements together and to lock external elements thereto, the adapters being formed of identical individual parts joined in the desired angular relationship prior to concealment within the tubular element, the entire assembly being accomplished without the use of tools.

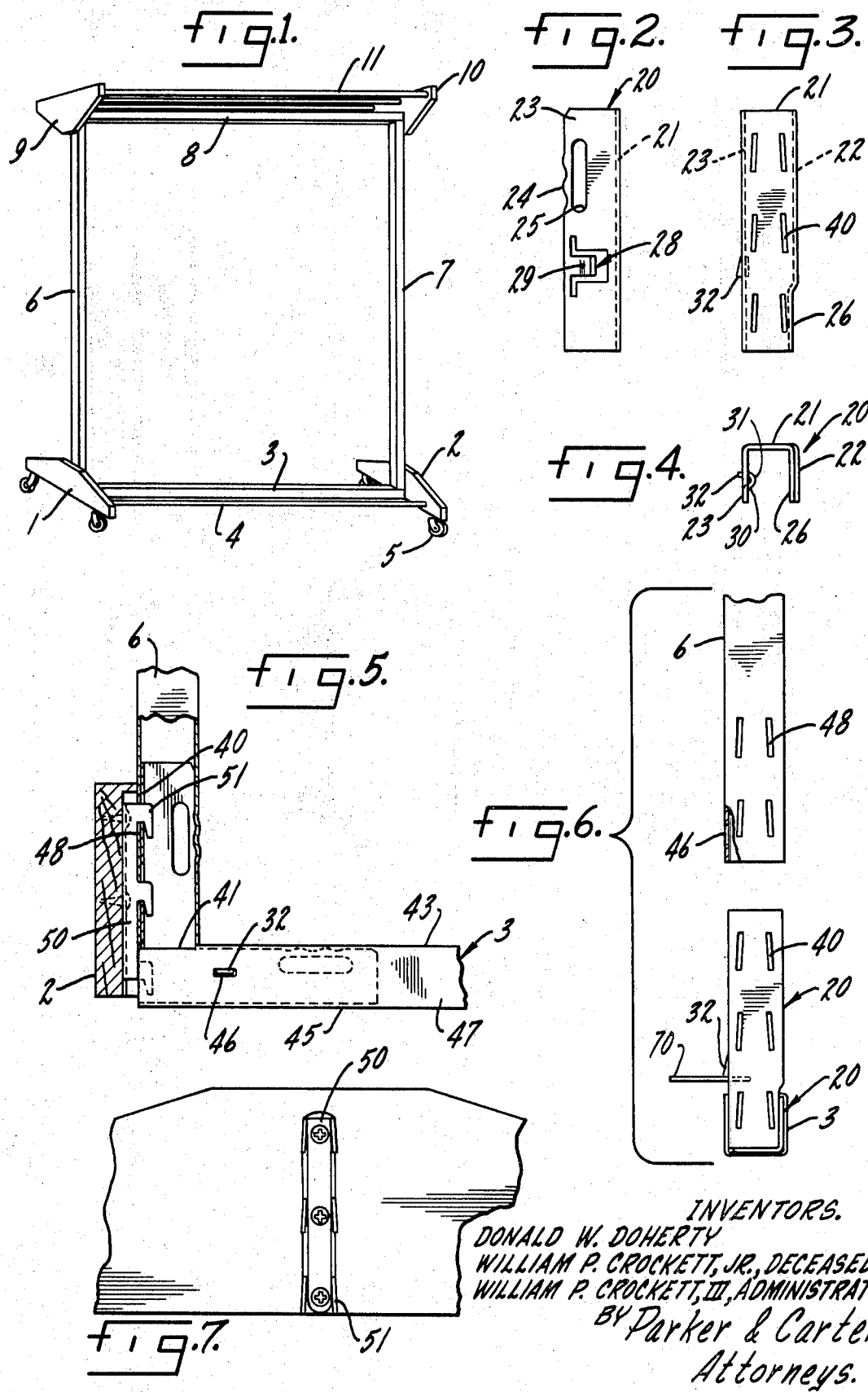

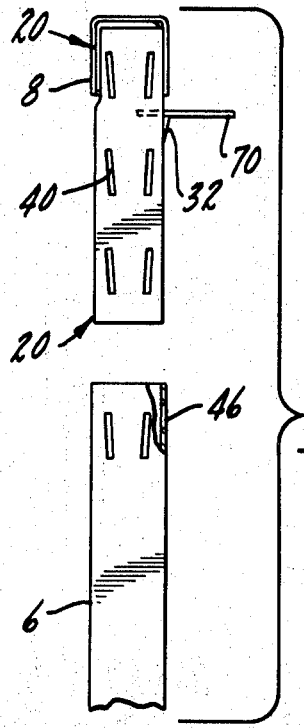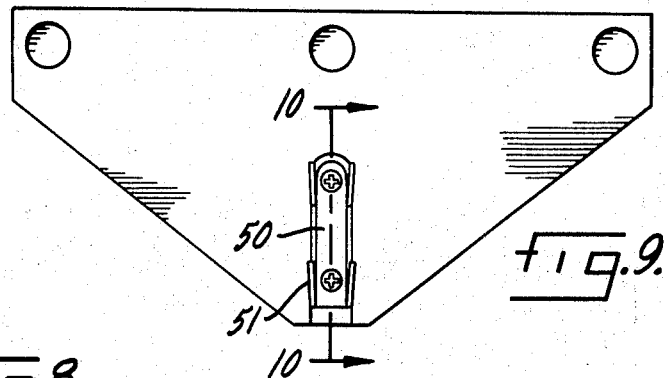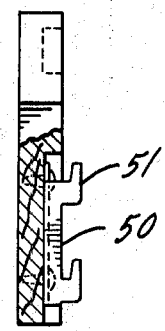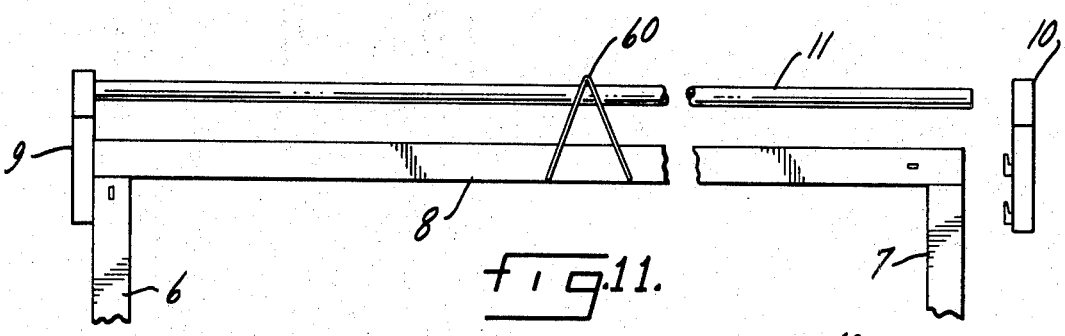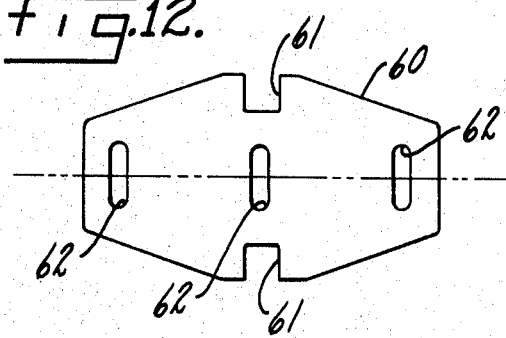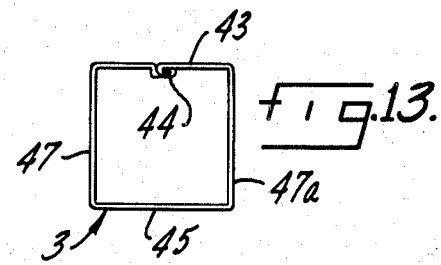

GARMENT RACK AND SQUARE TUBE ASSEMBLY THEREFOR

Summary of the Invention

Identical individual adapter members are joined in the angular relationship desired between two tubular elements. The adapters carry conformations effective to retain the same snugly and concealed with the tubular element, to lock the same to the tubular element and to provide for attachment of external elements to the tubular element and the adapter.

This invention relates to structures formed of assembled tubular elements and has particular relation to such structures incorporating tubes having rectangular cross-sectional configuration.

Rectangular tubing, such as square tubing, is subject to disfiguration upon bending. Welding or otherwise joining separate rectangular tubes is expensive and time-consuming. It is accordingly one purpose of the invention to provide structures incorporating rectangular tubes joined in angular relationships and having a neat, clean appearance.

Another purpose is to provide a means and method enabling shipment of elements in knockdown status and assembly thereof on the job with minimum requirement for skill and with no need for tools.

Another purpose is to provide a means and method of forming structures of rectangular tubing at minimum cost and economy in manufacture and assembly.

Other purposes will appear from time to time during the course of the specification and claims.

Brief Description of the Drawings

The invention is illustrated more or less diagrammatically in the accompanying drawings wherein:

FIG. 1 is a perspective view of an assembly formed in accordance with the invention;

FIG. 2 is a side view of an adapter element of the invention;

FIG. 3 is a view similar to FIG. 2 and illustrating an outer wall of the adapter of FIG. 3;

FIG. 4 is an end view of the adapter of FIG. 3;

FIG. 5 is a side view in partial cross section illustrating an assembly step;

FIG. 6 is an outer wall view illustrating another assembly step;

FIG. 7 is a partial elevation of an attachment;

FIG. 8 is a view similar to that of FIG. 6;

FIG. 9 is an inner elevation of another attachment;

FIG. 10 is a view taken on the line 10—10 of FIG. 9;

FIG. 11 is a side view illustrating use of a support member;

FIG. 12 is a planar view of the support member of FIG. 11; and

FIG. 13 is an end view of a square tube.

Like parts are indicated by like numerals throughout the specification and drawings.

Description of the Preferred Embodiment

FIG. 1, for purposes of illustration, discloses a garment rack. While it will be understood that the invention will find employment in a wide variety of structural assemblies, the garment rack structure of FIG. 1 will, for clarity, be referred to herein.

The rack of FIG. 1 includes base or leg members 1,2. Extending between leg members 1,2 is lower crosspiece or brace 3 comprising a square tube. A cylindrical member or rod 4 also extends between leg members 1,2. The leg members 1,2 parallel each other and extend perpendicularly to members 3,4 in opposite directions from the ends thereof. The leg members 1,2 may be conveniently formed of wood and include a wide central portion, the width of the leg members 1,2 decreasing in opposite directions toward their opposite ends. Ground-contacting roller members, such as the casters 5, depend from the opposite end portions of leg members 1,2.

Uprights 6,7 are formed of square or rectilinear tube members having the cross-sectional configuration and dimensions of member 3 and extend upwardly from the opposite ends of member 3. An upper crossmember or brace 8 extends between the upper ends of uprights 6,7 and also has the cross-sectional configuration and dimensions of members 3, 6 and 7.

Carried adjacent and outwardly of the upper ends of the uprights 6,7 are shelf end members 9,10. The members 9,10 also may conveniently have a wide central portion from which the members 9,10 diminish in width toward their opposite ends. Extending between the members 9,10 and above the crossmember 8 are a plurality of garment hanger cylindrical members or rods 11.

Referring now to FIGS. 2—4, there is illustrated an elongated adapter member 20. Member 20 is generally U-shaped in cross-sectional configuration and includes a base or outer wall portion 21 and spaced leg portions 22,23. Each of the leg portions 22,23 includes an undulating edge segment 24, the hills of which extend beyond the major portion of the edge. Each of said leg portions carries a slot 25 paralleling and in alignment with the undulating edge segments 24, the purpose of which slots will appear hereinbelow.

Leg portion 22 has one of its end segments recessed or inwardly disposed, as indicated at 26. The opposite leg portion 23 carries a lock element 28. It will be observed that the lock element 28 is formed integrally with the member 20, some of the material of said leg portion 23 being removed to leave a portion 29 which is deformed into a base segment 30, an inwardly curved segment 31 and a lock end segment 32, the end segment 32 extending outwardly beyond the external surface of leg 23.

The base or outer wall 21 carries notches or slots 40 in spaced, paired relationship. Each of the slots 40 is positioned alongside and adjacent the base of one of the legs 22,23. The notches 40 may have their outer edges outwardly inclined in the direction of the end of adapter 20 carrying the reduction or offset 26, as best seen in FIG. 3.

Members 3 and 8 have the end portion of a surface removed for a distance substantially equal to the width of member 6 or 7, as shown at 41 in FIG. 5. The surface from which the portion is removed, as indicated at 41, is the surface 43 carrying the mated or joined longitudinal edges of the sheet which forms, for example, the square tube member 3 or 8.

The inwardly directed bead 44 created by such joinder serves to insure the proper entry of an adapter member 20 into the square tube members 3, 6, 7 and 8, it being understood that the base 21 of member 20 will thus slide along the inner surface of the opposite wall 45 of each square tube member, whereas the bead 44 will prevent insertion of a member 20 in any other position within a square tube member.

With this in mind, each square tube member 3, 6, 7 and 8 carries the slot 46 in one of its sidewalls 47a for alignment with and penetration by the lock segment 32 when the member 20 has been fully inserted into a square tube member.

Similarly, slots 48 are formed in the surface 45 of the square tube members 6 and 7 and positioned for alignment with the slots 40 in the members 20 received within the members 6 and 7.

Support or attaching brackets 50 are supplied for securing leg members 1,2 and shelf end members 9,10 to the square tube elements 6 and 7. Each bracket 50 carries an appropriate number of spaced parallel ear segments 51 for insertion into and through slots 48 in tubes 6 and 7 and slots 40 in the adapters 20 therewithin, the ears being generally L-shaped with the longer leg portions extending away from the adjacent end of the tube member.

It will be understood that a pair of the identical adapter members 20 are first secured together in the desired angular relationship, as by spot welding, for example, in the manner illustrated in FIGS. 6 and 8. In the illustration, members 20 are joined normal to each other. The ends of the members 20 carrying the offsets 26 are interpenetrated, the offsets 26 resulting in overlapping end portions of the members 20 without an increase in the dimensions of the members 20 at the overlapping areas.

The invention may be employed in connection with the joinder of angularly disposed rectangular tube members in a structure in which the angle area thus created is exposed to view on all sides. In such event, the ends of the inner walls 43 of both rectangular tube members are removed as shown at 41 and the end portions of the sidewalls of the tube members are hampered for mitering, as will be well understood.

It will be well realized, also, that the invention may be employed in the joinder of converging rectangular tube members when the angle thus created is other than the 90° angle disclosed in the drawings herein, the members 20 being prejoined, in such event, at the desired angle.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

Two of the members 20 are factory-joined together with their end portions bearing the offset 26 in interpenetrating, overlapping relationship as illustrated in FIGS. 6 and 8, and brackets 50 are secured to members 1, 2, 9 and 10. Thereafter, all elements of the eventual structure may be packaged and shipped to the user in a minimum-sized container. Upon receipt, the user inserts one of the members 20 into one of the rectilinear tube members to be joined. Bead 44 precludes insertion of a member 20 unless the same is in proper positions for alignment of lock 32 with slot 46 and alignment of slots 48 and 40. The hills of undulating edge segment 24 are forced into the receiving tube member, the slot 25 permitting some flexing of segment 24, the resulting pressure of portion 24 against the inner surface of the tube member serving to provide a snug fit therewithin.

When a member 20 has been fully inserted within a square tube member, the lock 32 will snap into interpenetrating relation with slot 46 to retain said member 20 within the tube member until such time as lock 32 is pressed inwardly and the member 20 withdrawn.

With such full insertion of a member 20, the cooperating member 20 secured thereto will extend through the recess 41 in the tube member. Thus, for example, a member 20 will be inserted into each of the opposite open ends of tube 3, with the cooperating members 20 extending upwardly therefrom and through the recesses 41.

A tube member to be joined, such as the member 6, for example, is then slidably inserted over the cooperating adapter member 20. The member 6 will have a squared end since it will be inserted only until brought into contact with the tube member 3. The slot 46 in member 6 will, for this reason, be positioned closer to the end thereof than the slot 46 in member 3. Similarly, the slots 48 formed in the surface 45 of the member 6 will be fewer in number since the slots 40 adjacent the offset 26 in the member 20 received by tube 6 will not be covered by the wall 45 of tube 6.

Brackets 50 are secured to the inner surfaces of the thicker central portions of legs 1,2 and shelf ends 9,10. The ears 51 are inserted into and through the slots 48,40 of uprights 6,7 and the members 20 positioned therein. Members 1, 2, 9 and 10 are then moved relative to uprights 6 and 7 to seat the ears 51 fully in their cooperating slots.

The assembly of rods 4 and 11 is accomplished as members 1, 2, 9 and 10 are joined to the frame formed of members 3, 6, 7 and 8. With the leg 2, for example, in place, the rod 4 has one of its ends inserted in a suitable socket formed on the inner surface of leg 2. Leg 1 is then similarly secured to upright 6, the opposite end of tube 4 being received in a similar socket in leg 1.

Similarly, the member 9, for example, has the ears 51 of its bracket 50 inserted into the slots in upright 6 and the member 20 therewithin; each rack bar 11 has one of its ends inserted in corresponding sockets on the inner surface of end 9 and shelf end member 10 has the opposite ends of rack bars 11 received in corresponding sockets on its inner surface and the ears 51 of its bracket 50 inserted into the corresponding slots in upright 7 and the member 20 therewithin. As in the case of legs 1 and 2, the ends 9,10 are moved relatively to uprights 6 and 7 to force the ears 51 longitudinally therewithin and to firmly secure the members 1, 2, 4, 9, 10 and 11 to the frame formed of members 3, 6, 7 and 8.

As illustrated in FIG. 12, a rod support member 60 is formed of a single sheet or piece of relatively inexpensive material, such as cardboard for example. Member 60 is generally rectilinear in planar configuration and has a centrally positioned rectangular recess 61 in at least one of its opposite longitudinal edges. As shown, recess 61 is formed in both such edges, enabling folding of member 60 and engagement of both recesses 61 with crossmember 8 as shown in FIG. 11. With the member 8 received, at a point intermediate its ends, in recesses 61, the rods 11 may be dropped into the upwardly open pockets thus formed by spaced slots 62 in member 60 to hold rods 11, with one of their ends in the sockets of end 9 for example, while end 10 is brought into place. If desired, member 60 may be permitted to remain in place after completion of the assembly.

Thus is provided a means and method of achieving a strong rigid assembly of square tubes presenting a neat appearance unbroken by unsightly fasteners, welds or the like and of achieving such assembly without need for tools or equipment, the pairs of members 20 for each angle having been previously secured together.

With a pair of members 20 joined at the recessed areas 26, it is only necessary for the assembler to press a member 20 into the open end of first one and then another tube to join the same in rigid angular relationship, the locks 32 being pressed inwardly as the member 20 penetrates the tube and then snapping into locking engagement with slot 46. The tube may be later removed by pressing inwardly on locking ear 32, the structure 29,30,31 permitting such yielding, springlike action. The undulations 24 insure a snug, tight fit of members 20 in their associated tubes, slots 25 permitting a limited flexing of the material between undulations 24 and slot 25.

If no external appurtenances are involved, it will be understood that slots 48 may be dispensed with in the tubular members such as 3, 6, 7 and 8. When elements such as those shown at 1, 2, 9 and 10 are included, however, slots 48 permit rigid assembly thereof. Conveniently, slots 48 align fully with slots 40 when the tubular member 6, for example, is not fully home on its member 20. At that point ears 51 pass easily through slots 40,48. A guide, such as the bar indicated at 70, may be inserted alongside lock 28 to position the tube for insertion of ears 51. Thereafter bar 70 is removed and tube 6 is pressed home. The L-shaped ears 51 are thus gripped by the tube 6 above each ear and member 20 beneath, as best seen in FIG. 5.

From FIGS. 5—9, the number of slots 40 and 48 and ears 51 may be varied as required. Three sets of ears 51 are employed with the wider leg members 1,2, for example, while two sets are employed with self-ends 9,10. Since one set of ears 51 will enter the exposed end slots 40 of a member 20 in the illustrated assembly, only two sets of slots 48 are employed at the lower end of tube 6, for example, and one set of slots 48 are formed in the upper end of tube 6. Similarly, since tube 6 will not be as fully penetrated as tube 30, the opening or locking slot 46 is positioned nearer the ends of tubes 6, as best seen in FIGS. 6 and 8.

As above indicated, tube members may be joined with their inner walls 43 both recessed and their sidewalls 47,47a mitered or chamfered. In such event, slots 46 would be equidistant from the ends of their respective joined tube ends and, if external appurtenances were to be included, the number of slots 48 in the tube carrying the appurtenance would correspond to the number of ears 51 on the bracket secured to the appurtenance.

Thus a rigid assembly involving angularly disposed rectangular tube elements may be accomplished without the use of exposed fasteners or tools of any kind, mere manual pressure being sufficient to accomplish the entire onsite assembly.

The embodiments of the invention in which an exclusive property or privilege is claimed are defined as follows:

We claim:

1. A garment rack including a single, rectangular, open frame formed of four rectilinear, hollow tube lengths joined at their ends, leg members carried at the lower corners of said frame, ground-contacting rollers depending from said leg members, shelf-end members carried at the upper corners of said frame, and a plurality of rod elements extending across and above said frame and having their opposite ends received in said shelf-end members, said leg and shelf-end members each extending laterally in opposite directions from said frame and in parallel planes, and means received within the ends of said tube lengths and locking the same together, said means including adapter members joined at their ends and having integral locking portions resiliently penetrating openings in said tube lengths.

2. The structure of claim 1 characterized by and including aligned slots in said adapter members and said tube lengths and brackets secured to said leg members and shelf-end members, said brackets having ears penetrating said slots.

3. The structure of claim 2 wherein said adapter members and tube lengths are relatively movable after penetration of said ears to lock the same to said adapter members and tube lengths.

4. Means joining rectilinear, hollow tube lengths in angular relationship, including adapter members joined in said angular relationship, said members having a cross-sectional configuration snugly received within the tube lengths in response to manual pressure, and locking conformations on said tube lengths and members, said locking conformations being positioned for locking interengagement when said members have penetrated a desired distance into said tube lengths, said locking conformations including a lock ear yieldingly extending from each of said members and a locking slot in a wall of each of said tube lengths, said slot being positioned for entry of said ear when said members have penetrated said desired distance into said tube lengths, and alignable slots in contacting walls of said tube lengths and said adapter members.

5. The structure of claim 4 characterized by and including external elements, brackets secured to said elements and ears on said brackets, said ears being formed and adapted to penetrate said slots in said members and in said tube lengths when said slots are aligned.

6. The structure of claim 5 wherein said slots are alignable to permit penetration of said ears prior to full penetration of said members into said tube lengths, whereby further penetration of said members into said tube lengths after entry of said ears serves to lock said ears to said tube lengths and members.

7. The structure of claim 6 wherein said ears are L-shaped, the shorter leg of said ears extending through said slot, the longer leg of said ears engaging the inner surface of said members.